United States Patent [19]

Bülow et al.

[11] Patent Number: 6,006,797
[45] Date of Patent: Dec. 28, 1999

[54] METHOD AND VESSEL FOR THE STORAGE OF GAS

[75] Inventors: Martin Bülow, Basking Ridge, N.J.; Silvia Beatriz Dougill; Norman Douglas Parkyns, both of London, United Kingdom; Wasyl Michael Sajik, Frimley, Camberley, United Kingdom

[73] Assignee: The BOC Group plc, Windlesham, United Kingdom

[21] Appl. No.: 09/066,402

[22] PCT Filed: Oct. 31, 1996

[86] PCT No.: PCT/GB96/02667

§ 371 Date: Jun. 26, 1998

§ 102(e) Date: Jun. 26, 1998

[87] PCT Pub. No.: WO97/16509

PCT Pub. Date: May 9, 1997

[30] Foreign Application Priority Data

Nov. 2, 1995 [GB] United Kingdom .................... 9522476

[51] Int. Cl.[6] ....................................................... B65B 1/04
[52] U.S. Cl. .................................. 141/3; 141/20; 206/0.7
[58] Field of Search ............................. 206/0.7; 502/416; 141/3, 20, 18

[56] References Cited

U.S. PATENT DOCUMENTS 5,094,736   3/1992   Greenbank ................................ 206/0.7
5,632,788   5/1997   Rabren ..................................... 206/0.7

*Primary Examiner*—Steven O. Douglas
*Attorney, Agent, or Firm*—Philip H. Von Neida; Salvatore P. Pace

[57] ABSTRACT

Acetylene is stored at elevated pressure by charging with acetylene at elevated pressure a pressure vessel (typically a gas cylinder) containing carbonaceous adsorbent able reversibly to adsorb acetylene. The adsorbent has: (a) a specific micropore volume equal to or greater than 0.5 $cm^3/g$; (b) a specific mesopore volume equal to or greater than 0.5 $cm^3/g$; (c) a bulk density equal to or greater than 0.25 $g/cm^3$; and (d) a surface area per volume equal to or greater than 400 $m^2/cm^3$. Alternatively or in addition to (a) and (b) above, the specific volume of pores having a diameter in the range of 1.5 to 3.0 nm is equal to or greater than 0.3 $cm^3/g$, but the sum of the specific mesopore volume and the specific micropore volume should always be equal to or greater than 1.0 $cm^3/g$. Preferably, at least 75% of the specific mesopore volume is contributed by mesopores having a diameter in the range of 2 to 5 nm and at least 90% of the micropores have a diameter of at least 0.4 nm. The adsorbent is typically in a free-flowing or monolithic form.

20 Claims, 5 Drawing Sheets

METHOD AND VESSEL FOR THE STORAGE OF GAS

This invention relates to a method and vessel for the storage of gas, namely acetylene, and to the use of carbonaceous adsorbents for storing acetylene.

Acetylene is used in industry as a fuel gas for gas welding and gas cutting operations, in particular, but it has the disadvantage of being very unstable. If an ignition source is present, pure acetylene under a pressure as low as 1.4 bar decomposes violently. Acetylene is not therefore stored as an uninterrupted homogeneous gaseous phase under pressure in a gas cylinder.

The universally used commercial method of storing acetylene is to dissolve the acetylene in a suitable solvent, typically acetone, to lower its activity (i.e. its chemical reactivity). The resulting solution of acetylene is absorbed in a solid porous mass within a pressure vessel, typically a gas cylinder, in order to inhibit the decomposition of acetylene. The mass typically has pores of a size in the range of 50 to 250 nm. With this known method, using acetone as the solvent, acetylene gas cylinders have a limiting safety pressure of 18.7 bar absolute at 15° C. according to United Kingdom Governmental regulations. The main disadvantages of this dissolved acetylene storage system are its inability to provide acetylene at high flow rates, particularly when most of the acetylene has been discharged from the cylinder, and the discharge of some acetone vapour together with the acetylene. Other disadvantages of the system include a limited storage capacity in view of the limit on the maximum permitted pressure, a rapid decrease in pressure with decreasing ambient temperature, and no capability for either bulk storage or bulk transportation, unless in cylinders that are manifolded together.

It is therefore not surprising that alternative acetylene storage methods have been proposed. For example, as long ago as 1964, French patent No 1 417 235 disclosed utilising cylinders for the storage of acetylene that contain an solid adsorbent for acetylene. No specific adsorbent for this purpose was, however, disclosed in French patent No 1 417 235. Further, although there is some sparse experimental data relating to the adsorption of acetylene at pressures up to about 1 bar, there is no experimental data at all for adsorption at elevated. Accordingly, no practical use has been made of solid adsorbents in the storage of acetylene at elevated pressure.

EP-A-0 467 486 discloses specific activated carbon adsorbents for the storage of methane. There is a suggestion that the general class of adsorbents disclosed therein can be used for the storage of acetylene. No specific example of an adsorbent for this purpose is, however, given.

There is, thus, a need in the art for specific adsorbents that are particularly suited to the storage of acetylene at elevated pressure. In investigating adsorbents for this purpose, we have found that the criteria for the selection of a suitable adsorbent are relatively complex and cannot be derived from the state of the art.

According to a first aspect of the present invention there is provided a method of storing acetylene at elevated pressure, comprising charging with acetylene at elevated pressure a pressure vessel containing carbonaceous adsorbent able reversibly to adsorb acetylene, in which the adsorbent has:

a. a specific micropore volume equal to or greater than 0.5 $cm^3/g$;

b. a specific mesopore volume equal to or greater than 0.5 $cm^3/g$;

c. a bulk density equal to or greater than 0.25 $g/cm^3$; and d. surface area per unit volume equal to or greater than 400 $m^2/cm^3$.

According to a second aspect of the present invention there is provided a pressure vessel for the storage, transport and delivery of acetylene under pressure, containing carbonaceous adsorbent able reversibly to adsorb acetylene, in which the adsorbent has:

a. a specific micropore volume equal to or greater than 0.5 $cm^3/g$;

b. a specific mesopore volume equal to or greater than 0.5 $cm^3/g$;

c. a bulk density equal to or greater than 0.25 $g/cm^3$; and d. surface area per unit volume equal to or greater than 400 $m^2/cm^3$.

According to a third aspect of the present invention there is provided the use, for storage under pressure of acetylene, of a carbonaceous adsorbent able reversibly toadsorb acetylene, the carbonaceous adsorbent having:

a. a specific micropore volume equal to or greater than 0.5 $cm^3/g$;

b. a specific mesopore volume equal to or greater than 0.5 $cm^3/g$;

c. a bulk density equal to or greater than 0.25 $g/cm^3$; and d. surface area per unit volume equal to or greater than 400 $m^2/cm^3$.

Alternatively, in the said three aspects of the present invention the total of the specific micropore and specific mesopore volumes is equal to or greater than 1.0 $cm^3/g$, and the specific volume of pores having an effective diameter size in the range of from 1.5 to 3.0 nm is equal to or greater than 0.3 $cm^3/g$, or preferably is equal or greater than 0.5 $cm^3/g$.

Preferably, the carbonaceous adsorbent has a specific macropore volume of from 0 to 0.16 $cm^3/g$, and a specific surface area of at least 1500 $m^2/g$.

Any adsorbent typically contains a multitude of open or accessible pores of varying sizes. If the pore size distribution (i.e. frequency of pore diameter versus pore diameter) is plotted, the resultant curve will typically have one or more maxima. Carbonaceous adsorbents for use in the invention preferably have at least two such maxima. It is typically found that carbonaceous adsorbents suitable for use in the invention have at least three such maxima.

As used herein, the definition of pore types follows the IUPAC classification, cf. IUPAC Manual of Symbols and Terminology, Appendix 2, Pt 1, Colloid and Surface Chemistry, Pure Appl. Chem., 31 (1972) 578. The term "micropore" characterises a pore having a diameter less than 2 nm; the term "mesopore" means a pore having a diameter in the range from 2 nm to 50 nm, and the term "macropore" means a pore having a diameter greater than 50 nm. One reason for distinguishing between micropores and mesopores is because there is a difference in the nature of gas adsorption in the two kinds of pore. When gas molecules are adsorbed in a micropore there is essentially a much stronger interaction between the gas molecules and the solid pore walls rather between the gas molecules themselves, the latter interaction being superimposed on the gas-solid interaction. Since nowhere in a micropore exists an interaction potential equal to zero, any gas molecule confined in a micropore is to be considered as being adsorbed. On the other hand, when gas molecules are adsorbed in a mesopore not only is there sorption interaction between the gas molecules and the wall of the pore, there is also interaction between the gas molecules adsorbed therein that may become comparatively strong. In the case of acetylene, this second kind of adsorption begins to occur at about a pore diameter (or size) of 1.5 nm. We believe the mechanism of acetylene adsorption in mesopores at superatmospheric pressures involves a pseudo-condensation of the acetylene, which causes another "densification" of acetylene, compared with that caused by the influence of the sorption interaction potential stemming only from the pore walls, the mechanism of latter may be similar to that in the micropores. In mesopores larger than 2 to 3 nm this may lead to a "meniscus" of the condensed acetylene with further acetylene molecules. For very strongly adsorbed chemicals, such as acetylene, the density of the sorbed phase in the range 1.5 to 2.5 nm may exceed the maximum density of acetylene in micropores, as it could be understood from principles of thermodynamics of interface phases. These phenomena depend, we believe, on the presence of sorption attraction forces from the opposite sides of the pore wall. If the diameter of the pore exceeds about 3 nm, the sorption attraction forces become significantly weaker, and the resulting additional densification effects less marked, but there may still occur the quasi-liquefaction of acetylene at elevated pressure, as it is typical of mesopores of any size. Accordingly, we believe that pores having a diameter or size in the range of from 1.5 nm to 3.0 nm are particularly effective in adsorbing acetylene, and it is generally preferable to maximise the "density" of such pores, or their specific mesopore volume, when preparing an adsorbent for use in the present invention. We further believe that the most effective pore sizes are those in the range of from 1.8 to 2.5 nm.

The specific surface area (A) is related to the monolayer capacity of the adsorbent (i.e. the amount of adsorbate which can be accommodated in a completely filled, single molecular layer) on the surface of one gramme of the solid by the equation:

$$A = n_m a_m L$$

where:

$n_m$ is the number of moles of adsorbate in the monolayer per gramme of adsorbent;

$a_m$ is the average area occupied by a molecule of adsorbate in a complete monolayer, and L is Avogadro's number (cf S J Gregg and K S W Sing, Adsorption, Surface Area and Porosity, Academic Press, Inc, London 1982, p 41 et seq.)

The monolayer capacity and hence the specific surface area are determined empirically by the BET method from a single adsorption isotherm, most conveniently using nitrogen at its boiling point, 77K, at atmospheric pressure, when the value of am is 0.16 $nm^2$ (see Gregg and Sing, cited above). This specific surface area is a quantity different from the geometrical specific surface area. It has been postulated that there is a maximum theoretical value of the geometrical specific surface area equal to 2622 $m^2/g$. This value was obtained on the assumption of a slit-like model of the adsorbent being composed by single layers of basal planes of the graphitic structure with micropores, each one of the latter being in-between two such layers, cf K R Matranga, A L Myers and E D Glandt: "Storage of Natural Gas by Adsorption on Activated Carbon", Chem Eng Sci 47 (1992) pp 1569–1579. Accordingly a specific surface area A, as high as, say, 3000 $m^2/g$ may not be real, geometrically. The discrepancy between such a specific surface area, A, and the geometrical specific surface area is reflected in the difference between applying a multilayer adsorption mechanism to the BET interpretation of the adsorption data and a monolayer adsorption mechanism/pore filling mechanism thereto. Values of the specific surface area, A, quoted herein have been calculated applying the monolayer adsorption mechanism to the interpretation of the data.

The pore size distribution can be determined from the same adsorption isotherm as the specific surface area A.

The specific micropore volume is most accurately determined by adsorption methods. It is recommended that the specific mesopore volume be determined by a combination of high pressure mercury porosimetry and an adsorption method. High pressure mercury porosimetry may be used for pore size down to 3.0 nm. The specific volume of pore sizes in the range 2.0 to 3.0 nm is preferably determined by adsorption methods analogous to those as employed to determine the specific micropore volume.

The specific micropore volume is preferably determined empirically from experimental adsorption isotherms, e.g. for nitrogen, and their evaluation by means of specific theoretical setups such as the Dubinin-Radushkevich equation, the Horvath-Kawazoe equation (G. Horwath and K. Kawazoe, J Chem. Eng. Japan, 16 (1983) 470, the BJH model (E. P. Barrett, L. G. Joyner and P. P. Halenda, J. Am. Chem. Soc.,73(1951)373) or other appropriate ones.

The bulk density of a particulate adsorbent is the mass-to-volume ratio of that adsorbent when uncompacted. The bulk density of a monolithic adsorbent is simply the mass-to-volume ratio of the monolith A particulate adsorbent may be compacted so as to reduce the proportion of void space in the volume it occupies until a closest possible packing, referred to herein as the packing density, is achieved. The bulk density (and the packing density) of a particulate adsorbent may be measured by the method according to ASTM D-2854.

The carbonaceous adsorbents for use in the method and pressure vessel according to the invention typically have substantial specific micropore and mesopore volumes. Preferably, more than 50% of the mesopores have a diameter in the range of 2 to 5 nm.

Acetylene is a relatively small molecule, and it might be expected that micropores which are of a similarly small size would play a far more critical role than mesopores in adsorbing acetylene. We have surprisingly discovered, however, that mesopores also play a critical role in the adsorption of acetylene. Although this phenomenon is not fully understood, the fact that acetylene has a critical temperature above normal ambient temperature (i.e. above 30° C.) may be of significance. As a result, high acetylene densities and, thus, high adsorbate concentrations may be achieved in the smaller diameter mesopores (i.e. having diameters in the range of 2 to 5 nm particularly those having diameters in the range of 2 to 3 nm) as well as in the micropores, particularly those having diameters in the range of 1.5 to 2 nm. Furthermore, the critical role played by the mesopores in the adsorption of acetylene ameliorates a particular problem associated with adsorption by micropores. This problem is that purely microporous adsorbents are known to have an adsorption isotherm which conforms to type I of the IUPAC classification following original work done by Brunauer, Deming, Deming and Teller (BDDT, cf. S Brunauer, L S Deming, W E Deming and E Teller: J. Amer. Chem. Soc. 62 (1940) 1723 ff). An isotherm of type I shows a strong uptake at low pressures leading to a plateau region with very little or no further uptake and thus conforms generally to a Langmuir adsorption isotherm. As a result, the adsorbent typically already reaches saturation at pressures near to atmospheric and, thus, if subject to a high pressure (e.g. 15 bar) fails to release an adequate amount of gas when the pressure is lowered again to atmospheric pressure. Thus, even if the amount of gas adsorbed, i.e. the storage capacity, at not too high a pressure is very large, the amount of deliverable gas also denoted below as deliverable capacity (for the fuel gas acetylene), that is the reversible gas uptake gained by decreasing the pressure from its upper value down to a value about atmospheric, is limited. The difference between the amount of acetylene gas stored at the highest operating pressure taken at 18 bar and that retained in the adsorbent at the lowest operating pressure taken at 1.5 bar, has been used throughout in this invention as reversible acetylene uptake (deliverable capacity).

As stated above, essentially microporous solids such as zeolitic molecular sieves as known to date, are unsuited for use in the method and pressure vessel according to the invention. We have found, however, that the mesopore volume of carbonaceous adsorbents suitable for use in the method and pressure vessel according to the invention substantially alters the shape of the adsorption isotherm so as to make it more nearly a Type II isotherm of the IUPAC classification which does not show the limiting plateau, but which exhibits a continuing rise at intermediate pressures with a final sharp upturn at highest pressures or other type of isotherm which within practical operating ranges results in a less limited reversible gas uptake.

As a result of the above-discussed properties of carbonaceous adsorbents for use in accordance with the invention, it is possible to achieve deliverable storage capacities at 25° C. in a pressure vessel of given size comparable with or greater than those obtained with the conventional method of storage, namely dissolving acetylene in acetone, and absorbing this acetone in a porous mass (i.e. greater than 125 g acetylene/liter adsorbent). Moreover, there is, of course, no possibility in the method of storage according to the invention of contaminating the acetylene released from storage with acetone. Furthermore, we believe that adsorptive storage of acetylene in accordance with the invention makes it possible to achieve a more uniform rate of release of acetylene from a pressure vessel as the storage pressure declines. A yet further advantage of the invention is, we believe, that acetylene can usefully be stored at pressures greater than those currently accepted in the United Kingdom as safe for dissolved acetylene storage. Accordingly, it may be possible to achieve by virtue of a higher storage pressure higher deliverable gas volumes than those obtainable with the conventional method of storage. Also, avoiding the use of solvent leads to a filled pressure vessel according to the invention being of lower weight than a comparable conventional cylinder containing acetone and a porous mass. The extent to which this improvement may take place will depend on the carbon density compared with that of the conventional porous mass. By substituting for the porous mass/acetone system an appropriate adsorbent system according to the invention, a higher degree of utilisation of a considered cylinder space can also be achieved.

Preferably, the total of the specific micropore volume and the specific mesopore volume is at least 1.2 $cm^3/g$. More preferably, the total of the specific micropore volume and the specific mesopore volume is at least 1.4 $cm^3/g$, and the specific mesopore volume is at least 0.7 $cm^3/g$. Even more preferably, at least 75% of this specific mesopore volume (and most preferably at least 90%) is contributed by mesopores having diameters in the range of 2 to 5 nm. Most preferably, the total specific volume of pores having a size (diameter, if cylindrical) in the range of from 1.5 to 3 nm is equal to or greater than 1.0 $cm^3/g$.

Since acetylene has a molecular size of about 0.4 nm, those micropores with a smaller size contribute little or nothing to the sorption of acetylene. Accordingly, preferably at least 90%, more preferably at least 95%, and most preferably all the micropores, have a diameter of at least 0.4 nm.

Although carbonaceous adsorbents having a specific surface area of c. 4500 $m^2/g$ are known (see are EP-A-0 366 796), we particularly prefer the specific surface area to be in the range of 3000 to 4000 $m^2/g$. The larger the specific surface area, the greater, in general, is the total of the specific micropore and mesopore volumes. However, the larger the specific surface area, the lower are the bulk and packing densities of the adsorbent and hence the lower is the effective amount of adsorbent that can be accommodated in a pressure vessel of given volume. There is thus an inherent conflict between maximising the pore volume or the specific surface area of an adsorbent on the one hand, and maximising the bulk density of the adsorbent so as to maximise the effective amount of adsorbent that can be housed in the pressure vessel. In fact, the surface area of the adsorbent per unit volume, that is the specific surface area multiplied by the bulk density of the adsorbent, is more significant than either parameter taken alone and is preferably maximised. The surface area per unit volume is preferably at least 800 $m^2/cm^3$ and more preferably at least 1000 $m^2/cm^3$, although values higher than 1500 $m^2/cm^3$ are difficult to obtain in practice.

It is desirable to keep any specific macropore volume to a minimum. Accordingly, the specific macropore volume is most preferably less than 0.05 $cm^3/g$ and is ideally zero.

The carbonaceous material for use in storing acetylene in accordance with the invention is preferably activated carbon. The adsorbent preferably takes the form of free-flowing pellets of activated carbon. Alternatively, it can take the form of beads, microbeads, fibres, discs or may comprise one or more monolithic bodies. Particulate forms of the adsorbent may have any one or more of a wide range of particulate sizes.

Preferably, the bulk density of the carbonaceous adsorbent is above the minimum bulk density of 0.25 $g/cm^3$ and is at least 0.3 $g/cm^3$. More preferably, the bulk density is at least 0.35 $g/cm^3$. As mentioned above, the greater the bulk density for a given total of micropore and mesopore volumes, the greater the deliverable storage capacity of a pressure vessel according to the invention. The greater the bulk density, the less the possibility of a particulate adsorbent being elutriated with the acetylene during its discharge from the pressure vessel. Further protection against such elutriation can be achieved by forming said pellets into one or more monolithic bodies in situ in the pressure vessel. Accordingly, the carbonaceous adsorbent can take the form of one or more monoliths of agglomerated individual pellets (or other agglomerated small bodies) of activated carbon which may be held together by a binder. A high bulk density (near to the value of the particle density, and typically up to 0.8 $g/cm^3$ can thereby be achieved, but typically at the expense of some loss of adsorption capacity, and at least some reduction in the rate at which gas can be released, since the binder tends to block some of the pores. Any one of a number of different binders may be used. For example, the binder may be a pitch, a clay, a cellulose type material or a polymer, for example, such as of a phenolic resin (e.g. NOVALAK), or a polyethylene type material, such as poly (tetrafluoro)ethylene.

Preferably, a particulate carbonaceous adsorbent is subjected to compaction prior to charging the pressure vessel with acetylene. Accordingly, the density is increased and can approach the packing density.

The pressure vessel preferably takes the form of a gas cylinder of any convenient size, although other shapes of vessel could be used. If one or more monoliths of the carbonaceous adsorbent are employed they may be inserted through an open base region of the vessel. The base may then be welded to the rest of the vessel. The pressure vessel can be charged with acetylene under pressure by conventional means. The storage pressure (of a fully charged pressure vessel) is preferably in the range of 15 to 30 bar. More preferably, the storage pressure is in the range of from 18 to 30 bar, i.e. above a pressure considered in the United Kingdom to be safe for the storage of a solution of acetylene in acetone.

A pressure vessel according to the invention may be charged with acetylene and may be used at all normal ambient temperatures, including those in the range of minus 10 to plus 50° C.

Activated carbon pellets, suitable for use as carbonaceous adsorbents in the method according to the invention, having a large specific surface area can be made by methods well known in the art. The main processes utilised in these methods are pyrolysis, partial oxidation and carbonisation of a parent, usually organic feedstock that may be extremely complex. A state of the art description is given in J W Patrick, Porosity in Carbons: Characterisation and Applications, Halsted Press, New York, Toronto, 1995, 331 pp. There are, however, special and alternative methods of making super-activated carbonaceous adsorbents having a specific surface area greater than 3000 $m^2/g$, by mixing petroleum coke or other carbonaceous starting material, for example coconut shell char, typically with an excess amount of potassium hydroxide (KOH) (see, for example, U.S. Pat. No. 4,082,6 94and T Otowa Y Nojima and M Itoh, in "Fundamentals of Adsorption", Ed. M D LeVan, Kluwer Academic Publishers, Boston, 1996, 709–716), dehydrating the coke at 400° C., and activating the coke at 600–900° C. in an inert (nitrogen) atmosphere. The KOH to coke ratio by weight may be in the range of from 1:1 to 10:1 depending on the desired micropore to mesopore ratio. The greater the ratio of KOH to coke, the greater is the proportion of mesopores. To achieve activated carbons with a specific surface area greater than 3000 m2/g, KOH to coke weight ratios in excess of 4:1 are generally necessary. The dehydration step is performed in order to avoid the loss of carbon by direct steam attack. After activation a washing step is applied to the material. The goal of the washing step is to remove remaining KOH and salts that are formed during activation. An optimum temperature for the activation step is 700° C. because at temperatures exceeding 700° C., elemental potassium is formed and the process becomes hazardous. Further information relating to the manufacture of activated carbons is disclosed in the paper "Production and adsorption characteristics of MAXSORB: high-surface-area activated carbon" by Toshiro Otowa, Ritsuo Tanibata, and Masao Hoh, in Gas Separation and Purification, Volume 7, No 4, pp 241–245 (1993), in GB-A-2 223 223 and in EP-A-0 366 796. Resulting activated carbons may be formed into pellets, granules, discs or monoliths by mixing the carbon with a binder, which may be a clay, a cellulose or an organic binder, pressing or extruding, and drying it at elevated temperatures, such as in the range of c. 100 to 150° C. It is of course within the skill of the art to adjust the parameters of suitable manufacturing processes so as to obtain an activated carbon having properties that make it particularly suitable for use as a carbonaceous adsorbent for the storage of acetylene in accordance with the invention.

The method and pressure vessel according to the invention will now be described by way of example with reference to the accompanying drawings, in which:

FIG. 1 is not to scale.

Figure 1:
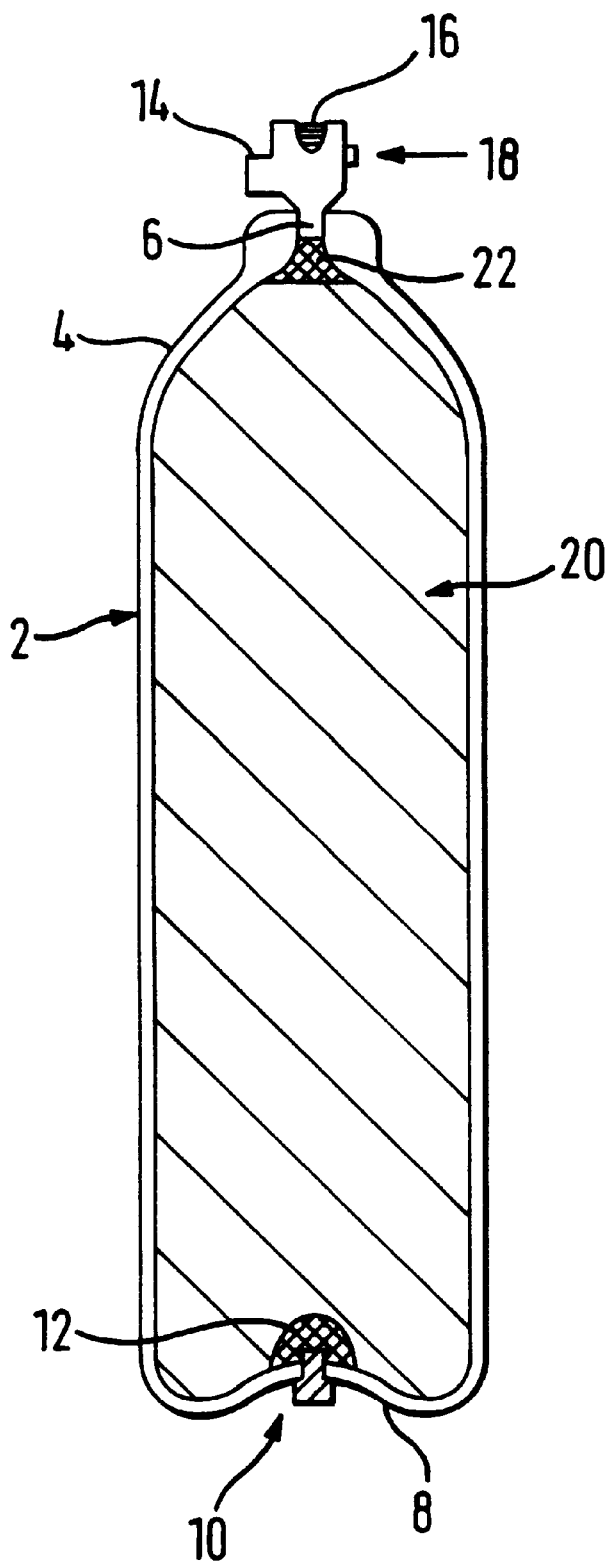
FIG. 1 is a schematic side elevation, partly in section, of a gas cylinder for the storage, transport and delivery of acetylene.
Figure 2:
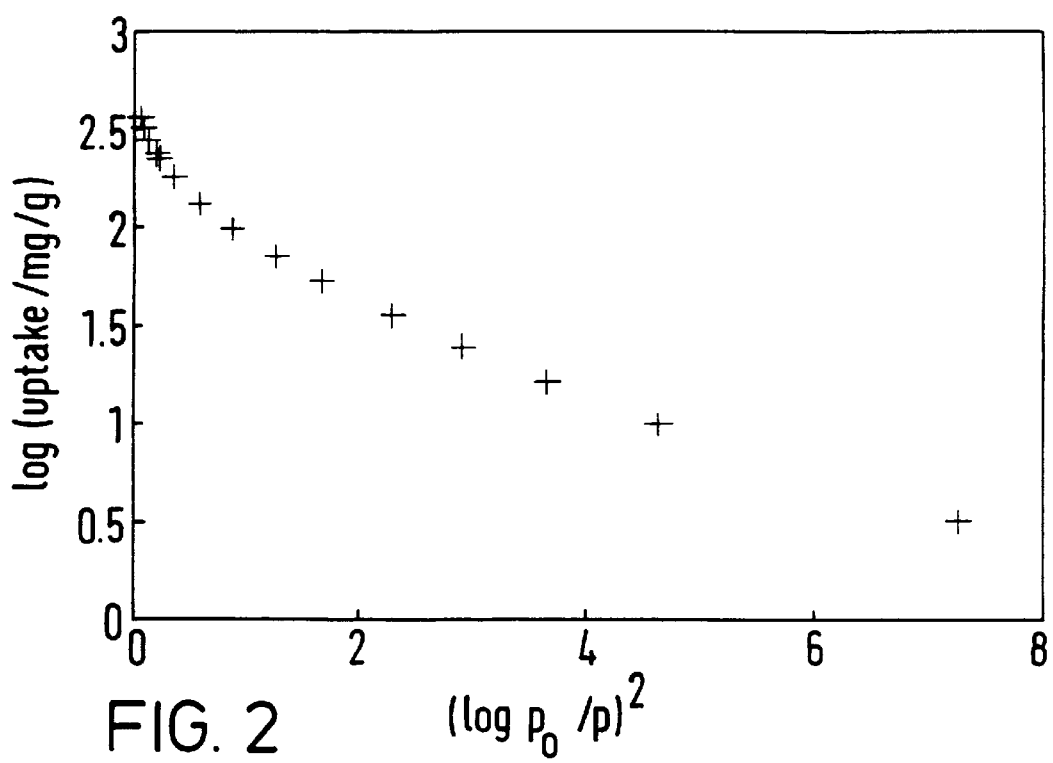
FIGS. 2 to 6 are all Dubinin-Radushkevich isotherm plots for the adsorption and desorption of carbon dioxide.
Figure 3:
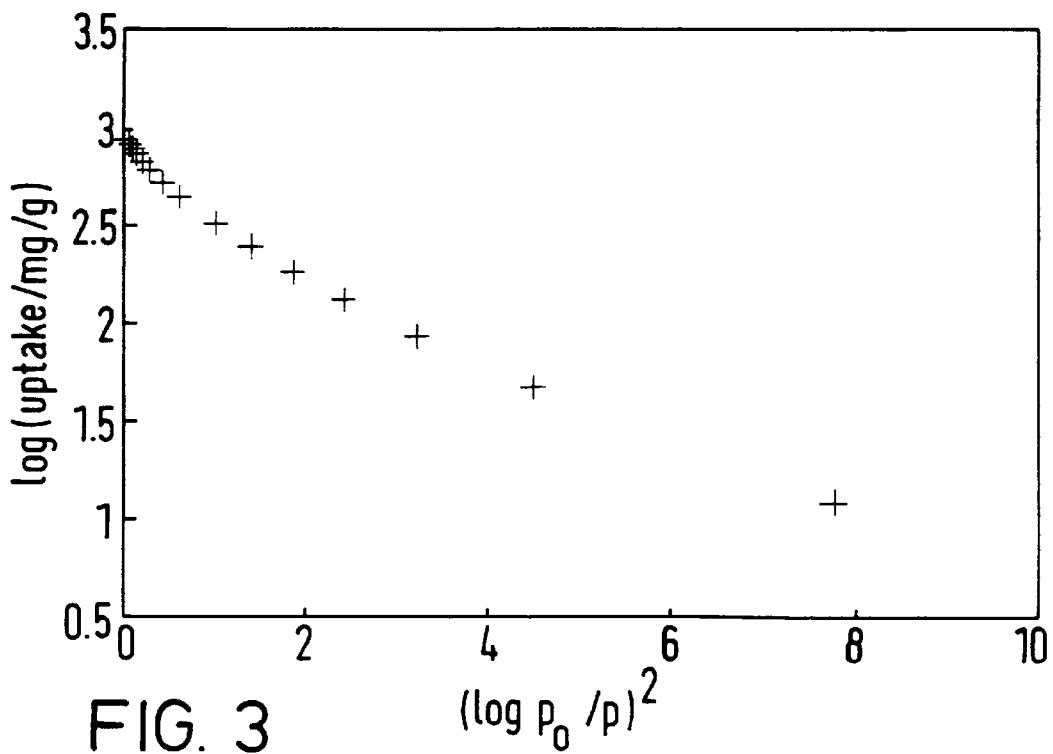
Figure 4:
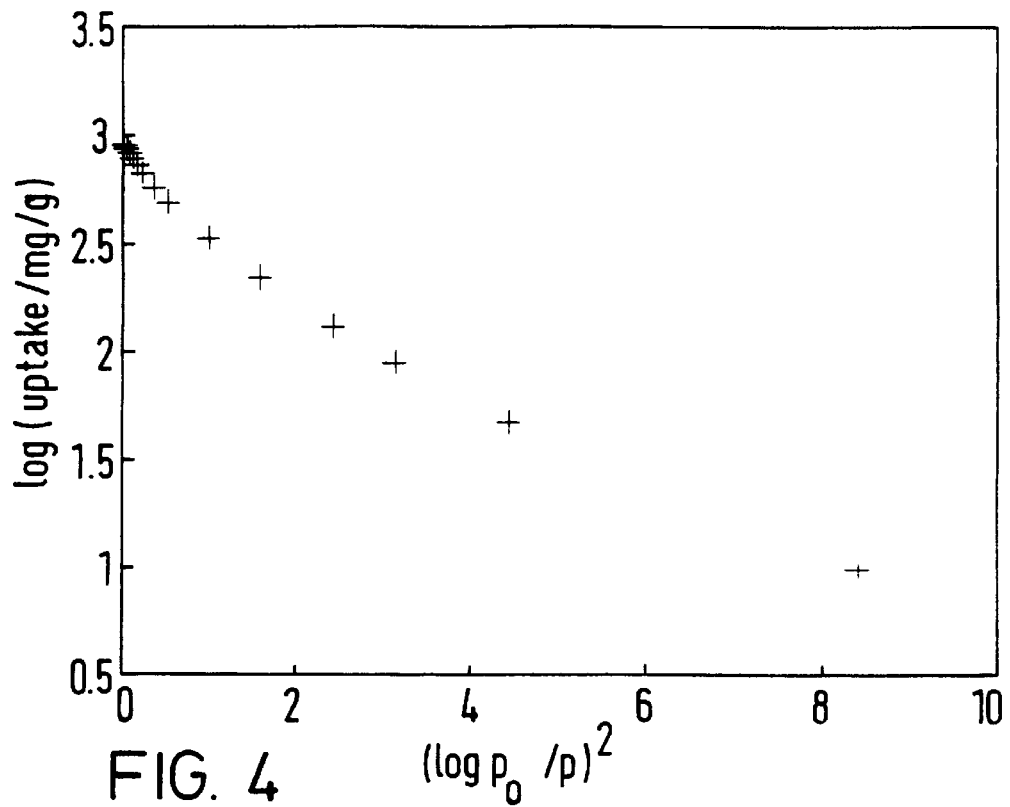
Figure 5:
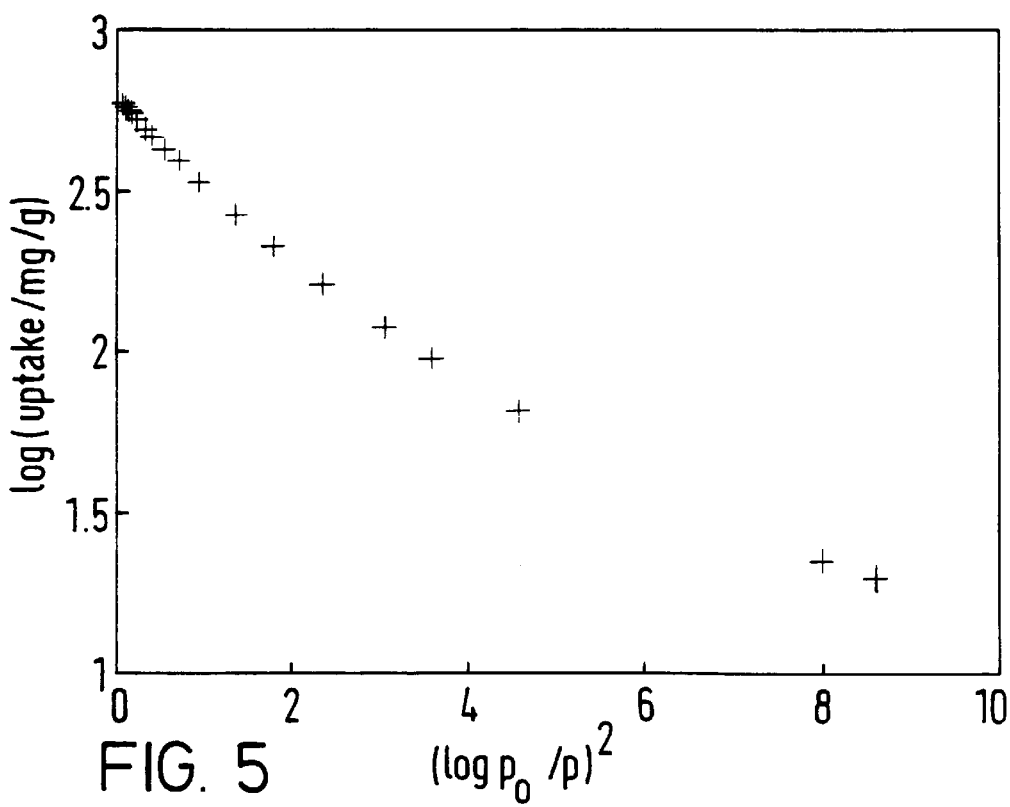
Figure 6:
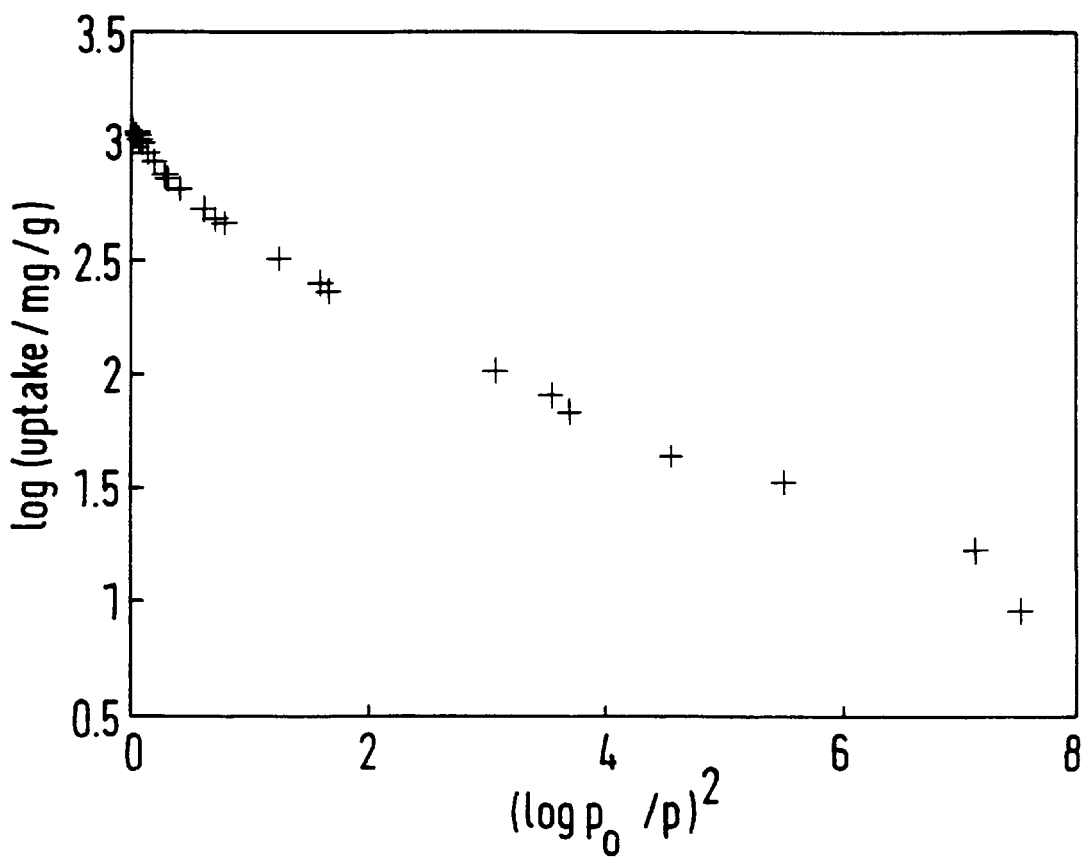

With reference to FIG. 1, a steel gas cylinder 2 has a neck portion 4 and a mouth 6. The cylinder 2 may be formed by conventional methods from any conventional steel of a kind suitable for use in pressure vessels. Such steels are well known in the art and need not be described herein. The cylinder 2 has a re-entrant base portion 8 which is fitted with an axial safety plug 10 in the same manner as a conventional cylinder. The safety plug 10 is guarded internally of the cylinder 2 by a gauze packing 12.

The mouth 6 of the cylinder 2 has an internal screw thread (not shown) which engages the external screw thread (not shown) of the body of a conventional cylinder valve 14. The valve 14 has a port 16 to which a gas supply pipe (not shown) and a pressure regulator (not shown) may be connected, or via which the cylinder 2 may be charged with acetylene from a pressurised source of acetylene. The valve 14 has an internal passage (not shown) which communicates with the interior of the cylinder 2 and which is sealed by a safety plug 18. The construction and manufacture of the valve 14 are well known and need not be described further.

The interior of the cylinder 2 is packed with pellets 20 of a carbonaceous adsorbent (for example, activated carbon) suitable for use in storing acetylene under pressure in accordance with the invention. The top of the interior of the neck portion 4 is provided with a gauze packing 22. The gauze packing 22 ensures that there is no uninterrupted free space in which a detonation of the acetylene can take place and helps to minimise elutriation of the adsorbent.

An empty cylinder 2 may be made ready for use in accordance with the invention by providing a small volume of the packing 12 around the safety plug 10. Before fitting the cylinder valve 14, the cylinder 2 is filled with pellets of the carbonaceous adsorbent almost to the level of the mouth 6. During this operation, the cylinder 2 is bumped several times in order to ensure that the pellets of carbonaceous adsorbent settle fully. If desired, the pellets may be subjected to a compaction force so as to maximise the number of pellets which can be accommodated. The compaction force should not however be so great as to damage the pellets. After the cylinder has been charged with the pellets 20, gauze packing 22 is inserted into the cylinder so as to take up empty space in the top of the neck portion 4 and the cylinder valve 14 is fitted. The cylinder 2, thus charged with pellets 20 of carbonaceous adsorbent, is filled with acetylene at a site of acetylene production. The cylinder is placed in communication with a main (not shown) containing acetylene at a desired filling pressure, typically in the range of 15 to 30 bar. Acetylene is caused to flow under pressure into the cylinder with the valve 14 in its open position. Once a desired mass of acetylene has been charged into the cylinder 2, the cylinder valve 14 is closed. The acetylene cylinder may then be transported to a depot (not shown) from which the cylinder 2 can be sold or hired out. Acetylene may be released from the cylinder opening the valve 14.

The method of storing acetylene and the pressure vessel according to the invention are further illustrated by the following examples. Each of the examples describes the adsorption characteristics of a different carbonaceous material and resinous. The adsorption characteristics of each adsorbent are given by equilibrium take up and release of carbon dioxide. The experiments were performed using both carbon dioxide in preference to acetylene in view of the relative ease of handling the former and acetylene as well. We believe the data from carbon dioxide isotherms can be used to predict corresponding values for acetylene. This is due to a close similarity between certain chemical and physical bulk properties of both gases, that are responsible for sorption equilibrium behaviour. For example, we have found that the adsorption isotherms of the two gases on a carbonaceous material known as NUXIT-AL are indistinguishable from one another, provided that the data are plotted for the same relative pressures, $p/p_o$, where $p_o$ is the saturation vapour pressure of the species being sorbed as a liquid phase at temperature T. To convert from mass of carbon dioxide adsorbed to that of acetylene, we assume that the adsorbed molecular volume of the two gases is essentially the same. There is some evidence for this, as the densities for the liquid gases near to the critical temperature correspond almost exactly to the ratio of their molecular weights. Moreover, the physical size of the molecules of the two types in the gaseous phase is very close. Accordingly, it seems to be legitimate to use carbon dioxide as a test gas when assessing the suitability of an adsorbent for use in the method according to the present invention. This has then been confirmed by results obtained for high pressure adsorption isotherms measured directly for the fuel gas acetylene., cf. below.

In the Examples adsorption data is interpreted by the Dubinin-Radushkevich (DR) equation which in the form used herein is:

$$v(p)=v_o\exp[-B(RT\ln p/p_o)^2]$$

where v=amount of gas adsorbed $v_o$ is a system specific constant

B is another system specific constant

R=the universal gas constant

T=temperature of measurement p=equilibrium pressure of the adsorbate $p_o$=saturation vapour pressure of the liquid phase of the adsorbate.

See M M Dubinin and L V Radushkevich, Proc Acad Sci USSR, 55,331 (1947) cited in "Adsorption of Gases on Heterogeneous Surfaces" by R Rudzinski and D H Everett, 1992, pp 42–51.

Examples 1 to 5 below refer, respectively, to FIGS. 2 to 6. In each Figure, the data are plotted according to the Dubinin-Radushkevich method, in which the logarithm (base 10) of the uptake (mg/g) (i.e. mg of gas per g of adsorbent) is plotted against the square of log (base 10) $p_o/p$.

The deliverable storage capacity for acetylene per liter of adsorbent, at 25° C. between 18 bar and 1.5 bar (the working limits of the present acetylene cylinder), was calculated for each adsorbent from the respective carbon dioxide isotherm and is reported in each example as reversible uptake per liter of adsorbent within those pressure limits.

EXAMPLE 1 (COMPARATIVE)

The carbon dioxide isotherm was determined at 25° C. for a resin Amberlite XAD-4 (available from Aldrich Ltd, The Old Brickyard, New Road, Gillingham, Dorset SP8 4HL, England) having a specific surface area of 830 $m^2/g$, a specific micropore volume of 0.15 $cm^3/g$, a specific mesopore volume of 0.975 $cm^3/g$, a specific macropore volume 0.015 $cm^3/g$, and a bulk density of 0.6 $g/cm^3$. The isotherm is presented in FIG. 2 as a Dubinin-Radushkevich plot. The derived reversible acetylene uptake amounts to 72.6 g acetylene/liter adsorbent.

This example shows that a large specific mesopore volume of itself is inadequate to give an adequate reversible acetylene uptake.

EXAMPLE 2 (COMPARATIVE)

The carbon dioxide isotherm was determined at 25° C. for a carbon fibre material, Nanofibre A20 (available from Osaka Gas Co Ltd, 19-9, 6-Chome Torishima, Konohonaku, Osaka 554, Japan) having a specific surface area of 2000 $m^2/g$, a specific micropore volume of 1.1 $cm^3/g$, no mesopore or macropore volume, and a bulk density of 0.18 $g/cm^3$. The isotherm is presented in FIG. 3 as a Dubinin-Radushkevich plot. The derived reversible acetylene uptake amounts to 57.1 g acetylene/liter adsorbent.

This example shows that a large micropore volume of itself is not sufficient for adequate acetylene uptake properties. The relatively low uptake per volume value is also affected by the low density, which results from not only the very high micropore volume but which is also due to the physical form of the adsorbent that makes it difficult to pack.

EXAMPLE 3 (COMPARATIVE)

The carbon dioxide isotherm was determined at 25° C. for a MAXSORB-type carbon material, sample grade G08H, (available from Kansai Coke & Chemicals Co Ltd, 5 Misono-cho, Amagaski, 660 Japan). The adsorbent had a specific surface area of 2250 $m^2/g$, a total specific pore volume of 1.15 $cm^3/g$, and a bulk density of 0.3 $g/cm^3$. The isotherm is presented in FIG. 4 as a Dubinin-Radushkevich plot. The derived reversible acetylene uptake amounts to 99.6 g acetylene/liter adsorbent. This example shows that a high value of the specific surface area is not of itself sufficient to impart favourable acetylene uptake properties to the adsorbent.

EXAMPLE 4 (COMPARATIVE)

The carbon dioxide isotherm was determined at 25° C. for an activated coconut shell carbon, AR1 (available from Sutcliffe Speakman Carbons Ltd, Lockett Road, Ashtonin-Makerfield, Lancashire, WN4 8DE, England). The adsorbent had a specific surface area of 1644 $m^2/g$, a specific micropore volume of 0.73 $cm^3/g$, a specific mesopore volume of 0.26 $cm^3/g$, a specific macropore volume of 0.34 $cm^3/g$, and a bulk density of 0.45 $g/cm^3$. The isotherm is presented in FIG. 5 as a Dubinin-Radushkevich plot. The derived reversible acetylene uptake amounts to 97.7 g acetylene/liter adsorbent.

This example shows that a high value of bulk density is not of itself sufficient to impart favourable acetylene uptake properties to an activated carbon adsorbent.

EXAMPLE 5

The carbon dioxide isotherm was determined at 25° C. for a super-activated carbon material, sample grade M-30, available from Osaka Gas Co Ltd, having a specific surface area of about 3000 $m^2/g$, a specific micropore volume of 0.6 $cm^3/g$, a specific mesopore volume of 0.9 $cm^3/g$, a specific macropore volume of 0.15 $cm^3/g$, and a bulk density of about 0.35 g/cm³. The specific surface area per volume was thus about 1050 m²/cm³. Most of the mesopores had a diameter in the range of 2 to 5 nm. No micropores having a diameter less than 0.4 nm were detected. The isotherm is presented in FIG. 6 as a Dubinin-Radushkevich plot. The derived reversible acetylene uptake (deliverable capacity) amounts to 143 g acetylene/liter adsorbent.

The isotherm data were verified by adsorption data obtained by direct measurements of adsorption isosteres over a region of adsorbed amounts from 0.04 to 23.6 mmol/g for the Osaka Gas M-30 adsorbent employing the isosteric method with a minimum dead volume as it is described in "Determination of Sorption Thermodynamic Functions for Multicomponent Gas Mixtures Sorbed by Molecular Sieves", M Bülow, Stud Surface Sci Catal, Vol 83 (1994), pp 209–215.

Example 5 illustrates the importance of relatively high values of surface area per volume, specific micropore volume and specific mesopore volume to obtaining reversible acetylene uptake and characteristics comparable with conventional dissolved acetylene storage systems.

Figure 7:
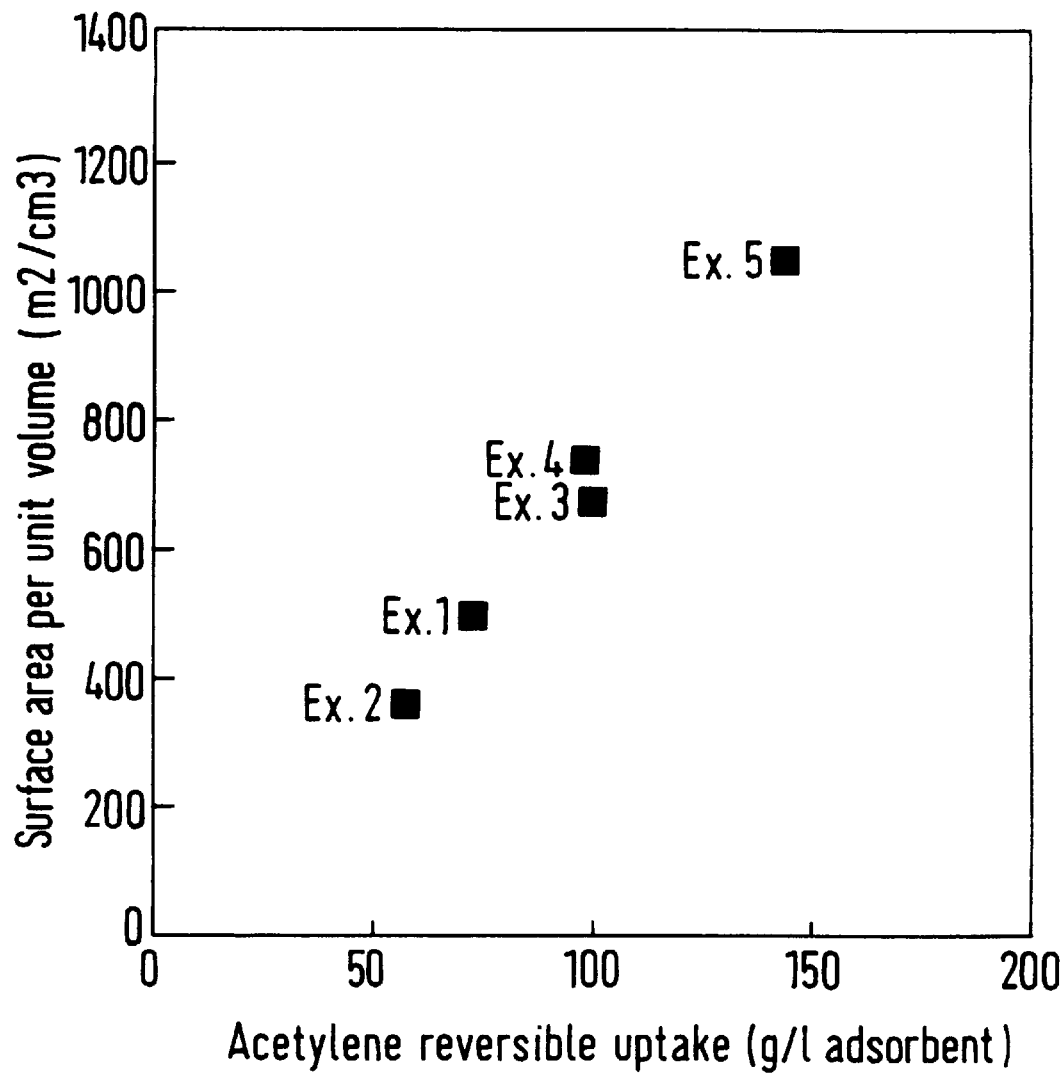
FIG. 7 is a graph of surface area per volume plotted against reversible acetylene uptake for different carbonaceous adsorbents.

FIG. 7 illustrates that there is an essentially linear relationship between the surface area per volume of adsorbent and its reversible acetylene uptake (deliverable capacity) (expressed in grammes of acetylene per liter of adsorbent). The five points illustrated in FIG. 7 are taken from the five examples above.

It is important to note that the reversible acetylene uptake shown in FIG. 7 is effectively the minimum reversible uptake. We believe it is in practice possible to increase, typically by up to 25%, the reversible acetylene uptake by subjecting the adsorbent to compaction so as to increase its effective density.

EXAMPLE 6

The acetylene adsorption isotherm for a sample of the super-activated carbon material, sample grade M-30, available from Osaka Gas Co Ltd, as in Example 5 was determined. A reversible uptake (deliverable capacity) of 128 g of acetylene per liter was obtained, a 10.5% difference from the value predicted using carbon dioxide measurement.

EXAMPLE 7

A monolithic carbon material, (produced by Kansai Coke & Chemicals Co Ltd, 5 Misono-cho, Amagaski, 660 Japan) having the properties, a specific surface area of 3027 m²/g, a solid density of 0.32 g/ml, a specific micropore volume of 0.93 ml/g, and a specific mesopore volume of 0.65 ml/g, was utilised for sorption measurements. This material was made by compaction of a Maxsorb type powder. The reversible acetylene uptake derived from a carbon dioxide adsorption isotherm measured on this material, was 131 g/l. The reversible acetylene uptake (deliverable capacity) calculated directly from an acetylene adsorption isotherm was 122 g/l. These are high values, bearing in mind the low bulk density of the monolith. It is believed that by increasing the solid density by means of a greater pressure during the compaction process, a substantially greater deliverable acetylene capacity can be achieved.

EXAMPLE 8

Another monolithic sample (obtained from Kansai Coke & Chemicals Co Ltd, 5 Misono-cho, Amagaski, 660 Japan), based on the MAXSORB-type activated carbon employed for preparing the material used in Example 7, and having the following properties: a specific surface area of 2888 m²/g, a bulk density of 0.29 g/ml, a specific mesopore volume of 0.59 ml/g, and a specific micropore volume of 0.92 ml/g, was utilised for acetylene sorption measurements. The reversible acetylene uptake (deliverable capacity) calculated from an acetylene adsorption isotherm was found to be 110 g/l. These are high values, bearing in mind the low bulk density of the monolith. It is believed that by increasing the bulk density, a substantially greater deliverable acetylene capacity can be achieved.

EXAMPLE 9

Another sample (obtained from Kansai Coke & Chemicals Co Ltd, 5 Misono-cho, Amagaski, 660 Japan),) based on a MAXSORB-type activated carbon comprised a monolithic carbonaceous adsorbent with a bulk density of 0.5 g/ml, a specific surface area of 2600 m²/g, and a total of specific micropore volume and specific mesopore volume greater than 1.0 cm³/g was utilised for acetylene adsorption measurements. The reversible acetylene uptake (deliverable capacity) calculated from an acetylene adsorption isotherm was found to be 144 g/l.

EXAMPLE 10

A monolithic carbonaceous adsorbent (obtained from Sutcliffe Speakman Carbons Ltd, Lockett Road, Ashton-in-Makerfield, Lancashire, WN4 8DE, England) prepared from an activated carbon formed from coconut shells, having a density of 0.56 g/cm³, a specific surface area of 2201 m²/g, a specific micropore volume of 1.01 cm³/g, and a specific mesopore volume of 0.23 cm³/g was utilised for sorption measurements. A first adsorption isotherm was plotted for carbon dioxide at 25° C. The reversible acetylene uptake (deliverable capacity) calculated from this isotherm, was found to be 191 g/l. A second adsorption isotherm as measured for acetylene at 25° C., was plotted. The reversible acetylene uptake (deliverable capacity) was calculated from this isotherm as 144 g/l.

We claim:

1. A method of storing acetylene at elevated pressure, comprising charging with acetylene at elevated pressure a pressure vessel containing carbonaceous adsorbent able reversibly to adsorb acetylene, in which the adsorbent has:
   a. a specific micropore volume equal to or greater than 0.5 cm³/g;
   b. a specific mesopore volume equal to or greater than 0.5 cm³/g;
   c. a bulk density equal to or greater than 0.25 g/cm³; and
   d. a surface area per volume equal to or greater than 400 m²/cm³.

2. A method as claimed in claim 1, in which the specific volume of pores having a size in the range of from 1.5 to 3.0 nm is equal to or greater than 0.3 cm³/g.

3. A method as claimed in claim 1, in which at least 75% of the specific mesopore volume is contributed by mesopores having a diameter in the range of 2 to 5 nm.

4. A method as claimed in claim 1, in which at least 90% of the micropores have a diameter of at least 0.4 nm.

5. A method as claimed in claim 1, in which the surface area per volume is in the range of 800 to 1500 m²/cm³.

6. A method as claimed in claim 1, in which the adsorbent takes the form of one or more monoliths of agglomerated or compacted bodies of activated carbon.

7. A method of storing acetylene at elevated pressure, comprising charging with acetylene at elevated pressure a pressure vessel containing carbonaceous adsorbent able reversibly to adsorb acetylene, in which the adsorbent has:

a. a total of specific micropore volume and specific mesopore volume equal to or greater than 1.0 cm$^3$/g;

b. a bulk density equal to or greater than 0.25 g/cm$^3$;

c. a surface area per volume equal to or greater than 400 m$^2$/cm$^3$; and d. a specific volume of pores having a size in the range of from 1.5 to 3.0 nm equal to or greater than 0.3 cm$^3$/g.

8. A method as claimed in claim 7, in which at least 75% of the specific mesopore volume is contributed by mesopores having a diameter in the range of 2 to 5 nm.

9. A method as claimed in claim 8, in which at least 90% of the micropores have a diameter of at least 0.4 nm.

10. A method as claimed in claim 9, in which the surface area per volume is in the range of 800 to 1500 m$^2$/cm$^3$.

11. A method as claimed in claim 10, in which the adsorbent takes the form of one or more monoliths of agglomerated or compacted bodies of activated carbon.

12. A method as claimed in claim 7, in which at least 90% of the micropores have a diameter of at least 0.4 nm.

13. A pressure vessel for the storage, transport and delivery of acetylene under pressure, containing carbonaceous adsorbent able reversibly to adsorb acetylene, in which the adsorbent has:

a. a specific micropore volume equal to or greater than 0.5 cm$^3$/g;

b. a specific mesopore volume equal to or greater than 0.5 cm$^3$/g;

c. a bulk density equal to or greater than 0.25 g/cm$^3$; and d. a surface area per volume equal to or greater than 400 m$^2$/cm$^3$.

14. A pressure vessel as claimed in claim 13, in which the specific volume of pores having a size in the range of from 1.5 to 3.0 nm is equal to or greater than 0.3 cm$^3$/g.

15. A pressure vessel as claimed in claim 13, in which at least 75% of the specific mesopore volume is contributed by mesopores having a diameter in the range of 2 to 5 nm.

16. A pressure vessel as claimed in claim 13, in which at least 90% of the micropores have a diameter of at least 0.4 nm.

17. A pressure vessel as claimed in claim 13, in which the surface areas per volume is in the range of 800 to 1500 m$^2$/cm$^3$.

18. A pressure vessel as claimed in claim 13, in which the adsorbent takes the form of one or more monoliths of agglomerated bodies of activated carbon.

19. A pressure vessel as claimed in claim 13, when charged with acetylene under pressure.

20. A pressure vessel for the storage, transport and delivery of acetylene under pressure, containing carbonaceous adsorbent able reversibly to adsorb acetylene, in which the adsorbent has:

a. a total of specific micropore volume and specific mesopore volume equal to or greater than 1.0 cm$^3$/g;

b. a bulk density equal to or greater than 0.25 g/cm$^3$;

c. a surface area per volume equal to or greater than 400 m$^2$/cm$^3$; and d. a specific volume of pores having a size in the range of from 1.5 to 3.0 nm equal to or greater than 0.3 cm$^3$/g.

* * * * *